US006635291B2

(12) United States Patent
Perry et al.

(10) Patent No.: US 6,635,291 B2
(45) Date of Patent: Oct. 21, 2003

(54) LEAVENED DOUGH OR BATTER PACKAGING SYSTEM

(75) Inventors: Michael R. Perry, Plymouth, MN (US); Mark A. Colman, Woodbury, MN (US)

(73) Assignee: The Pillsbury Company, Minneapolis, MN (US)

( * ) Notice: Subject to any disclaimer, the term of this patent is extended or adjusted under 35 U.S.C. 154(b) by 480 days.

(21) Appl. No.: 09/729,477

(22) Filed: Dec. 4, 2000

(65) Prior Publication Data

US 2001/0002270 A1 May 31, 2001

Related U.S. Application Data

(62) Division of application No. 08/461,199, filed on Jun. 5, 1995, now abandoned.

(51) Int. Cl.[7] .............................................. A21D 10/02
(52) U.S. Cl. ........................ 426/118; 426/113; 426/128; 426/551
(58) Field of Search ................................ 426/113, 118, 426/128, 396, 551

(56) References Cited

U.S. PATENT DOCUMENTS

| 1,554,077 A | 9/1925 | Fay |
|---|---|---|
| 1,811,772 A | 6/1931 | Willoughby |
| RE18,426 E | 4/1932 | Willoughby |
| 1,861,124 A | 5/1932 | Lorber |
| 1,988,058 A | 1/1935 | Trailer |
| 2,478,618 A | 8/1949 | Armstrong et al. |
| 2,753,268 A | 7/1956 | Ingle et al. |
| 2,810,650 A | 10/1957 | Joslin |
| 2,949,369 A | 8/1960 | Zoeller et al. |
| 2,955,045 A | 10/1960 | Coffey et al. |
| 2,957,750 A | 10/1960 | Knox, Jr. et al. |
| 2,967,777 A | 1/1961 | Grindrod |
| 2,980,540 A | 4/1961 | Turpin |
| 3,102,818 A | 9/1963 | Zoeller et al. |
| 3,148,635 A | 9/1964 | Reid |
| 3,222,189 A | 12/1965 | Perrozzi |
| 3,257,228 A | 6/1966 | Reed |
| 3,304,185 A | 2/1967 | Fortney |
| 3,397,064 A | 8/1968 | Matz |
| 3,433,646 A | 3/1969 | Savre et al. |
| 3,502,487 A | 3/1970 | Byrd |
| 3,506,183 A | 4/1970 | Turpin et al. |
| 3,510,050 A | 5/1970 | Culley et al. |
| 3,512,632 A | 5/1970 | Wiggins |
| 3,522,061 A | 7/1970 | Whiteford |
| 3,524,401 A | 8/1970 | Hoefield et al. |
| 3,554,762 A | 1/1971 | Craig et al. |
| 3,652,297 A | 3/1972 | Peterson et al. |
| 3,677,774 A | 7/1972 | Rausing |
| 3,851,757 A | 12/1974 | Turpin |
| 3,874,548 A | 4/1975 | Buff, Jr. |
| 3,879,563 A | 4/1975 | Tucker et al. |
| 3,972,468 A | 8/1976 | Reid |
| 4,038,428 A | 7/1977 | Davis, Jr. |
| 4,120,984 A | 10/1978 | Richardson et al. |
| 4,297,378 A | 10/1981 | Haasl et al. |
| 4,337,116 A | 6/1982 | Foster et al. |
| 4,372,982 A | 2/1983 | Haasl et al. |
| 4,381,315 A | 4/1983 | Young et al. |
| 4,388,336 A | 6/1983 | Young et al. |
| 4,415,598 A | 11/1983 | Chen et al. |
| 4,420,496 A | 12/1983 | Hanson, Jr. et al. |
| 4,503,083 A | 3/1985 | Glicksman et al. |
| 4,526,801 A | 7/1985 | Atwell |
| 4,548,852 A | 10/1985 | Mitchell |
| 4,769,245 A | 9/1988 | Farrar |
| 4,840,271 A | 6/1989 | Garwood |
| 4,904,836 A | 2/1990 | Turpin et al. |
| 4,919,949 A | 4/1990 | Miltz et al. |
| 5,084,284 A | 1/1992 | McDilda et al. |
| 5,106,635 A | 4/1992 | McCutchan et al. |
| 5,164,208 A | 11/1992 | Thomas, Jr. |
| 5,240,133 A | 8/1993 | Thomas, Jr. |
| 5,296,021 A | 3/1994 | Clapp et al. |
| 5,366,744 A | 11/1994 | Drummond et al. |
| 5,405,636 A | 4/1995 | Gard et al. |
| 5,409,724 A | 4/1995 | Heidolph et al. |
| 5,547,694 A | 8/1996 | Perry et al. |

FOREIGN PATENT DOCUMENTS

| CA | 499837 | 2/1954 |
|---|---|---|
| EP | 0 158 590 | 10/1985 |
| EP | 0 368 601 | 5/1990 |
| EP | 0 672 349 | 9/1995 |
| FR | 2533806 | 6/1984 |
| GB | 821371 | 10/1959 |
| WO | WO 93/01724 | 2/1993 |

OTHER PUBLICATIONS

"Methods for extending shelf life of a variety of food products", *Food Processing* (Jan. 1985).
"Thermoforming CPET Trays: Up the Learning Curve", *Plastics Technology* (Dec. 1985).
"As Easy As 1, –2,–3", *Food and Drug Packaging* (Dec. 1985).
*The Wiley Encyclopedia of Packaging Technology*, John Wiley & Sons (1986).
*The American Society for Testing and Materials*, D882, pp. 333–334 (1988).

*Primary Examiner*—Arthur L. Corbin
(74) *Attorney, Agent, or Firm*—Michael C. Maier; Douglas J. Taylor; John A. O'Toole

(57) ABSTRACT

The invention is a packaging system for refrigerated leavened dough or batter compositions and includes a method for determining package seal strength for a refrigerated leavened composition. The system provides an environment within the package such that the composition attains a desired specific volume upon baking or cooking. The method includes the process of determining the specific volume required for the refrigerated leavened composition after baking, determining internal equilibrium pressure required to attain the specific volume after baking, determining the package dimension subject to the internal equilibrium pressure, and defining the pressure holding capacity required to maintain this pressure during the storage life of the refrigerated composition.

22 Claims, 9 Drawing Sheets

Pressure (psi)

LEAVENED DOUGH OR BATTER PACKAGING SYSTEM

This application is a divisional of application Ser. No. 08/461,199, filed Jun. 5, 1995, which application(s) are incorporated herein by reference.

FIELD OF THE INVENTION

The invention relates generally to packaging systems for refrigerated leavened compositions. More specifically, the invention relates to packaging for refrigerated leavened doughs and batters and methods for determining the seal strength necessary to maintain an internal equilibrium pressure necessary to provide a product, resulting from cooking the leavened composition, having a desired specific volume.

BACKGROUND OF THE INVENTION

Packaging serves any number of functions in the food product industry. Packaging may provide for distribution, promotion, and advertising of the product. Further, packaging can provide for definition of product shape and format, and provides the end consumer with varying degrees of portion control. Packaging may also serve to ensure product purity, quality and overall product integrity up to the point of use. To this end, packaging may also affect certain product characteristics, especially in those products which comprise chemical agents intended to affect product characteristics during or after baking.

The art of packaging food is well developed. For example, Lorber, U.S. Pat. No. 1,861,124, discloses a package for uncooked biscuits having a telescoping cover which rises as the dough rises to provide space for the increase in the size of the dough mass. Vents are provided for air to escape during the rising of the dough. The package may be in the form of a square box with partitions which divide the body of the package into square compartments, or in the form of a tube.

Traller, U.S. Pat. No. 1,988,058, discloses a dough package comprising a roll including sheets of dough between sheets of non-adhesive paper which is rolled into a substantially solid cylindrical mass. Farrar et al., U.S. Pat. No. 4,769,245, disclose a method for packaging brown and serve baked goods. Hot loaves of bread are heat sealed within a film which has horizontal and vertical seams. A minute filter hole or aperture is formed on the bottom of the package which permits the package to breathe without admitting an excess of microbes.

Wiggins, U.S. Pat. No. 3,512,632, discloses a pressure release valve for flexible pouches. Although in this case the food to be packaged is coffee beans, the package here permits venting of carbon dioxide emitted from the coffee beans. The package comprises a pouch or bag constructed of flexible film or sheet fitted with a one-way release valve.

Joslin, U.S. Pat. No. 2,810,650, may be of interest for disclosing doughs and batters which can be stored under refrigerated conditions for a long period of time without excessive gas evolution. Byrd, U.S. Pat. No. 3,502,487, discloses the packaging of foods. The disclosed package is vented for the exhaust of vapors and/or fluids. The package is sealed to prevent re-entry of vapors and/or fluids. The package is intended to accommodate extreme temperature changes and/or pressure conditions.

Drummond et al., U.S. Pat. No. 5,366,744, is directed to a method for making a packaged dough suitable for extended refrigerated storage and to a packaging system for storage of the refrigerated dough. In the packaging system for storage of refrigerated, leavened dough, Drummond teaches the use of a rigid hermetically sealed package containing a dough.

Turpin, U.S. Pat. No. 3,851,757, a two compartment package is described which consists of an outer spirally wound fiber can containing a dough product. The disclosed can also contains a second compartment which holds icing.

Davis, Jr., U.S. Pat. No. 4,038,428, relates to a method of packaging prepared piecrust dough that may be required to remain within its package for relatively long periods of time and within which thereafter the dough may be rolled into piecrust form while still in its packaging receptacle. Thomas, Jr., U.S. Pat. Nos. 5,164,208, and 5,240,133 disclose that engages a lid to a container by the formation of interlocking waves of lid material and container material.

One accepted means of packaging refrigerated, leavened doughs is through the use of fiber board cans such as those disclosed in McDilda et al U.S. Pat. No. 5,084,284. With this type of packaging, the dough is placed in the can prior to substantial proofing, so most of the proofing occurs in the can. The can itself is closed but not hermetically sealed after the dough has been placed in it. The leavening action in the dough causes the dough to rise in the closed can, and as the head space gas vents out of the can, the dough completely fills the inside of the can and seals it.

While many of these systems provide workable packaging alternatives, a large number of variables need to be considered when packaging a leavened composition.

As a result, there is a need in the marketplace for packaging technology which provides an alternative to the technology presently available.

SUMMARY OF THE INVENTION

In accordance with one aspect of the invention, there is provided a packaging system for refrigerated doughs or batters. The packaging system is designed to sustain pressure within the interior of the package and still be easily opened by the end consumer. The package of this system is capable of sustaining pressure within the package interior during the entire refrigerated storage life of the product. The package is also easily opened by the end consumer without the need for cutting or otherwise using a tool or additional instrument to open the package such as, for example, peeling the package apart or using other easily opened package configurations. The packaging system is designed to have a pressure holding capacity which is defined as the product of a package dimension subject to internal pressure and an internal equilibrium pressure. The internal equilibrium pressure is determined by the desired final cooked or baked product specific volume. The package dimension subject to internal pressure is determined by the particular package geometry which is, in turn, determined by the product geometry desired. By selecting a desired finished product specific volume, the internal equilibrium pressure necessary to obtain that finished product specific volume can be determined. The internal equilibrium pressure desired and the particular package geometry selected, considered with the ability of the end consumer to easily open the package, ultimately determine the required seal strength for the packaging system.

In accordance with another aspect of the invention, there is provided a method for determining package seal strength for a refrigerated leavened composition. The method comprises determining the specific volume required for the refrigerated leavened composition after baking, determining the internal equilibrium pressure required to attain the specific volume after baking, determining the package dimension subject to the internal equilibrium pressure, and defining the package seal strength by taking the product of the internal equilibrium pressure and the package dimension subject to the internal equilibrium pressure.

The package dimension subject to the internal equilibrium pressure is a projected area which is essentially in a plane of the packaging in which the position of maximum load of the seal lies, the projected area being defined by the portion of this plane which is limited by the inner surface of the package.

In accordance with another aspect of the invention, there is provided a package for leavened dough composition, said package having a seal strength determined by the method of the invention.

By selecting a desired finished product specific volume, and suitable dough product geometries, seal strengths can be predicted that sustain sufficient pressures during storage that provide the desired specific volumes upon cooking or baking the product. The invention provides a system for maintaining pressure within a refrigerated dough product by use of a sealed container. During storage, the leavening agent or agents within the dough generate an amount of gas within the dough. The container is designed to sustain the pressure, resulting from the gas generated by the leavening reaction in the dough, such that the dough product, once baked, attains the desired specific volume. Specific volume of the baked product is one means of gauging final baked product quality. Specific volume of a product is the volume of the product divided by the weight of that same product.

The amount of headspace or free space surrounding the dough in the container is not critical, as long as the container is capable of sustaining the internal equilibrium pressure required to maintain sufficient gas within the dough. Rather, the invention provides a method for ascertaining any number of parameters and defining a packaging system for use with a given dough.

Previously, only a few suitable alternatives to packaging refrigerated dough or batter containing leavening have been available. These packaging systems involve the use of a sturdy fiberboard can capable of sustaining very high levels of pressure within the can. These cans rely on the strength of the fiberboard walls and the crimped metal ends of the can to sustain the pressure within the package environment. Prior to the present invention, however, there have not been suitable alternatives to the fiberboard cans for packaging refrigerated dough which can sustain the dough so that it will result in baked or cooked product having desirable specific volumes. The packaging systems of the present invention permit the use of a much wider variety of packaging materials and configurations, in addition to providing consumer portion control and numerous product configurations desired by the end consumer. Another advantage is that the dough can still be packed prior to significant proofing, so that most of the handling occurs prior to the development of delicate dough structure.

The packaging system of the present invention provides packaging which is easy to open and yet will maintain the internal equilibrium pressure developed in the package during storage. In fact, the package may provide peel strengths of at most about 8 lbs/in which are peelable by the end consumer while having the capability of preserving internal equilibrium pressure under refrigerated conditions for about 6 months or longer.

One important aspect of the invention is that the package head space may be manipulated to provide any number of effects. The package may have any amount of headspace or may be devoid of head space. The packaging system of the invention allows for the partial or complete venting of the head space within the container after sealing. Further, the head space may be partially or fully evacuated and flushed with a fluid material such as a gas after sealing. The packaging system also allows for the containment of an internal equilibrium in the package between the gas contained in the dough and that gas in the head space of the package.

These advantages ultimately permit the use of virtually any kind of sealed container to package the dough, as long as it can sustain the pressure within the container over the storage time. To determine whether a container will sustain sufficient pressure within the dough to result in a desired specific volume, the present technology defines a correlation between dough geometry and seal strength that predicts the packaging requirements.

The compositions that can be used with the present technology are any dough or batter formulations which can generate gas within the composition once sealed in the container. Chemically leavened and yeast leavened doughs are suitable for use with this technology.

DETAILED DESCRIPTION OF THE PREFERRED EMBODIMENTS

Figure 1:
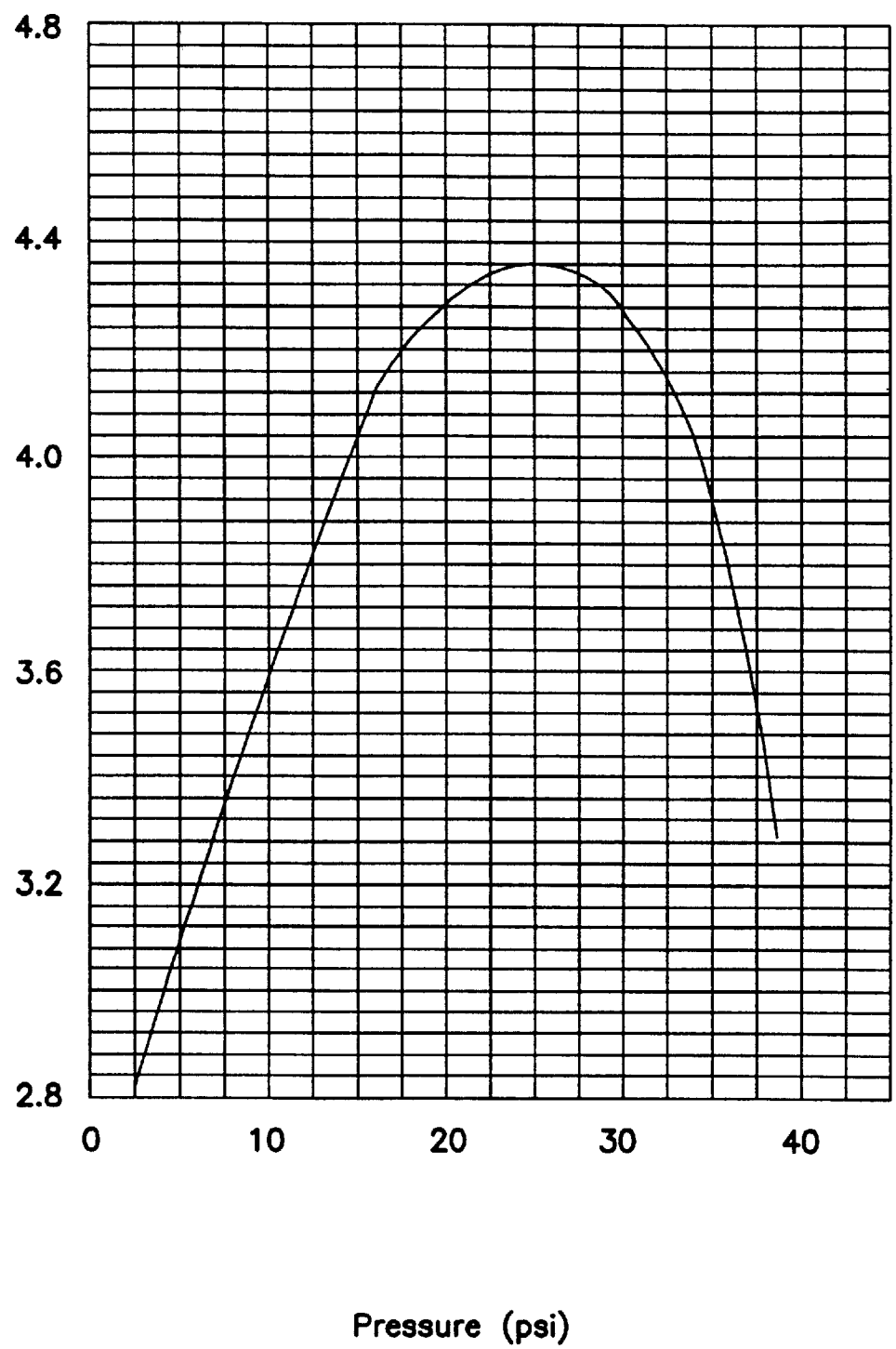
FIG. 1 is a schematic representation of an exemplary relationship between pressure and specific volume for a given dough composition.

The invention is a packaging system for refrigerated compositions which maintains, during the storage life of the composition, the ability of the composition to attain a desired specific volume upon cooking or baking the composition. The invention is also a method for determining package seal strength in packaging systems for leavened dough compositions which may be stored under refrigerated conditions, (34°–52° F.). The invention is also packaging systems resulting from this method.

The quality of the final baked product is most clearly gauged or measured by baked specific volume in the context of this invention. To obtain the maximum baked specific volume certain parameters must be considered. The dough composition generally must contain some type of leavening agent which generates gas within the dough.

In the context of the present invention, the term dough or doughs is used to define any leavened dough or batter formulation.

For any given dough system, there is a relationship between the baked specific volume and the pressure within the dough package. Mixing a dough with its leavening ingredients initiates the action of the leavening agent. Once packaged, the leavening agent continues to generate gas causing the dough to expand inside the package essentially "proofing" the dough. Proofing is a process in which the dough expands.

Generally, dough compositions can be either proofed fully or partially before packaging or fully or partially after packaging. After proofing, the dough is further developed in storage in a sealed container at refrigerated temperatures. Developing is a process in which pressure is generated after complete or partial proofing where further expansion of the dough is constrained by the package. The dough sealed in a container continues developing until a point in which the internal pressure of the container has reached an internal equilibrium pressure. During proofing and developing, the dough changes in quality including, for example, texture, density, and consistency. Additionally, during proofing and developing, pressure within the package increases. Internal equilibrium pressure may be defined by the pressure within the package when proofing and developing have reached an equilibrium within the package. As will be appreciated by those skilled in the art, pressure varies with temperature and external pressure and these variations are to be considered when designing a packaging system. Internal equilibrium pressure is hereinafter understood to include variations and extreme conditions of temperature and external pressure that the system will encounter during production, distribution, storage and use.

Proofing of refrigerated doughs is typically accomplished by first packaging the dough in a container which allows the gas to escape until the dough expands to a volume sufficient to completely fill the container. By elevating the temperatures above ambient temperature, the leaveners react more quickly than if the dough remains at room temperature. A positive internal pressure is typically established within about 48 hours after packaging. Internal equilibrium pressure may be attained several weeks after packaging, depending on the amount of dough, headspace if any, headspace gas concentration, external conditions and other parameters. It is not until the above-described proofing and developing steps are substantially complete that the dough can be baked and transformed into a baked good having an acceptable quality including the proper texture, taste and density.

Residual gaseous $O_2$ in the package headspace can lead to deterioration of dough quality. In the practice of this invention several methods may be used to reduce $O_2$ to acceptable levels. These headspace $O_2$ reduction methods include, but are not limited to, venting, gas flushing of the headspace, displacing $O_2$, evacuation and subsequent gas flushing of the headspace, absorption of $O_2$ by various $O_2$ scavengers, and the use of $O_2$ scavengers in the dough such as yeast. This benefits the dough by ultimately improving color, texture, taste, as well as other attributes of the finished baked product.

As described above, baked specific volume can be attributed to an internal equilibrium pressure within a given package. The internal equilibrium pressure is the pressure retained within the package and is measured relative to external pressure. FIG. 1 is an illustration of an exemplary comparison between specific volume in a final baked product versus the internal equilibrium pressure in a composite can in which the dough is contained.

The internal equilibrium pressure, along with the desired size and shape of the dough product, determine the geometry of the package in which the dough is contained. The package used for the leavened refrigerated dough should not only maintain the purity and quality of the dough prior to use but also should maintain the physical, chemical, and organoleptic character of the dough prior to use so that the finished baked product will have desired attributes such as specific volume, taste, color, texture and other organoleptic qualities.

Once the relationship between specific volume and internal equilibrium pressure has been determined, the desired internal equilibrium pressure needed to achieve the desired baked specific volume may be used to calculate the necessary pressure holding capacity of the package. The pressure holding capacity is determined in part by the strength of the seal used to seal the package, along with the strength of the materials used to make the package, needed to sustain the internal equilibrium pressure. Generally, the necessary package seal strength is determined by the product of the internal equilibrium pressure and the package dimension subject to the internal equilibrium pressure. In turn, the package dimension subject to the internal equilibrium pressure is dependent upon the geometry of the package. Ultimately, the package dimension subject to the internal equilibrium pressure defines the projected area.

In greater detail, for any given dough or batter formulation, the desired specific volume for the final baked product relates to an internal equilibrium pressure for the packaged dough product. The seal on the package used to contain the dough composition must have the necessary strength to contain the internal equilibrium pressure, preferably during at least the storage life of the packaged refrigerated dough product. The capability of the seal to contain the internal equilibrium pressure will be determined by pressure holding capacity of the package, which in turn is determined by the package geometry selected for the product. Package geometry will vary with the size and shape of the package. However, the package dimension subject to the internal pressure may be calculated for any package configuration by determining the position of maximum load for that package. An example of the system of the present invention will be described more fully below.

The pressure holding capacity is a function of many parameters such as material strength and seal composition and configuration. In systems of the present invention, where the package is selected to be easily opened by the consumer, it is preferred that the seal is the limiting element of the overall pressure holding capacity of the package. In other words, the packaging materials should be selected such that they themselves do not fail when used in the system of the present invention. The seal should be easily opened by the consumer but should have the capability of holding the pressure generated within the package. To determine the pressure holding capacity of a package, therefore, the maximum pressure sustainable by the seal must be determined. The pressure sustainable by a seal is related to the package geometry and the seal strength. The aspects of package geometry most relevant to the pressure holding capacity is the projected area. Once the projected area is determined, it is used in conjunction with the seal strength to determine the pressure holding capacity of a package.

Seals in packaging materials are most often found in two basic orientations in relation to the load exerted on the seal. When a load exerted on the seal is perpendicular to the seal width, such as seal width 15 in FIG. 2, the seal is said to be in peel. The strength of the seal in peel normalized to the length over which the force is exerted is the peel strength ($S_P$) with units of force per unit length such as g/cm, g/in, or lb/in. When a seal is oriented such that a load exerted on the seal is parallel to the seal width, the seal is said to be in shear. In shear, the load is distributed over the seal area defined by its width and its length. The strength of the seal in shear is typically normalized to the area over which the force is exerted. The shear strength ($S_S$) has units of force per unit area such as $g/cm^2$, $g/in^2$, or $lbs/in^2$.

Generally, shear strength of a seal is higher than its peel strength and can be increased easily by increasing the area over which the load is exerted. Seal shear strength can be increased to a point where package failure occurs in the packaging material and not at the seal itself. Peel strength of a seal usually is weaker than the packaging material itself and cannot be increased by an increase in the width of the seal. Most pressurized packages rupture or fail as a result of the normalized load in the peel direction exceeding the peel strength of the seal.

Shear strength and peel strength characterize the seal's ability to remain intact as loads are applied to the seal. Shear strength and peel strength are indicative of the condition of the seal as affected by the materials sealed together, the sealing conditions when the seal is made, temperature and duration of the load during which the characterization is made, age, etc.

The loads applied to the seals of leavened dough packages result primarily from the pressure within the container ($P_i$) relative to ambient conditions. In simple package geometries (i.e., domed or circular cross-sections) loads are distributed uniformly. Under pressure, flexible packages are deformed into bulged shapes. It is from these deformed shapes that the direction of the resultant force, $F_R$, is determined. For flexible packaging materials, that is, materials that cannot support a bending moment (i.e. can easily be bent or folded), the resultant load vector, $F_R$, on the seal is in a direction tangent to the inner edge of the seal.

Figure 7A:
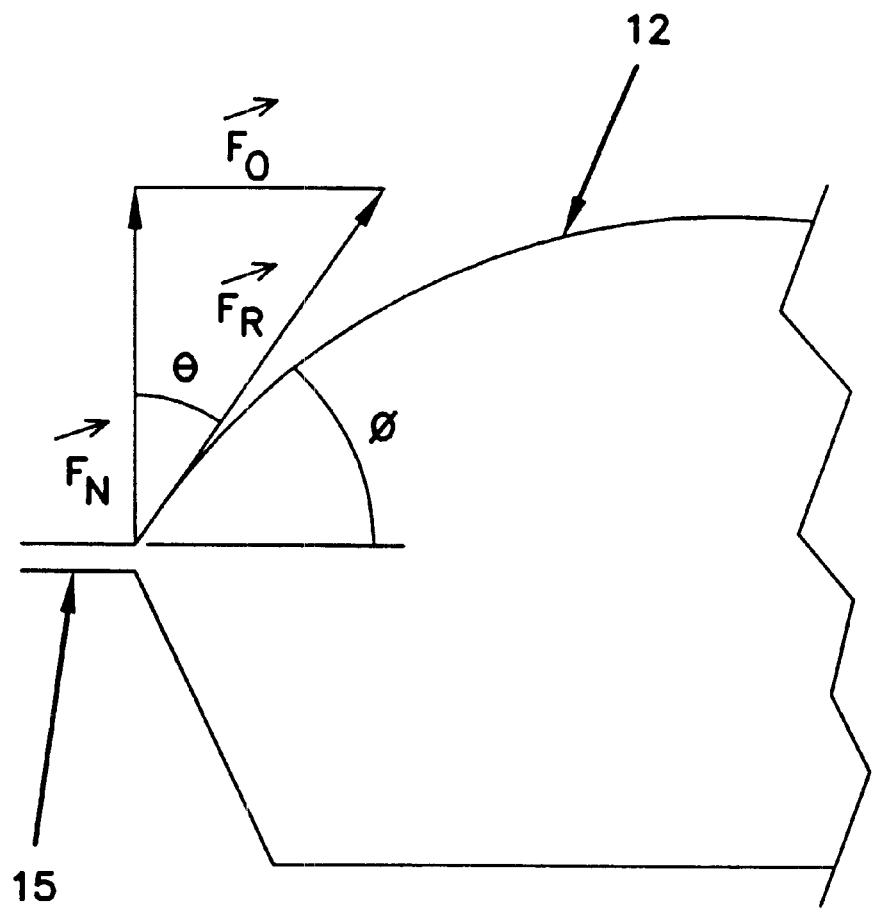
FIGS. 7a–c are various views depicting application of one aspect of the method of the invention to a further exemplary embodiment of a packaging system in accordance with the invention.
Figure 7B:
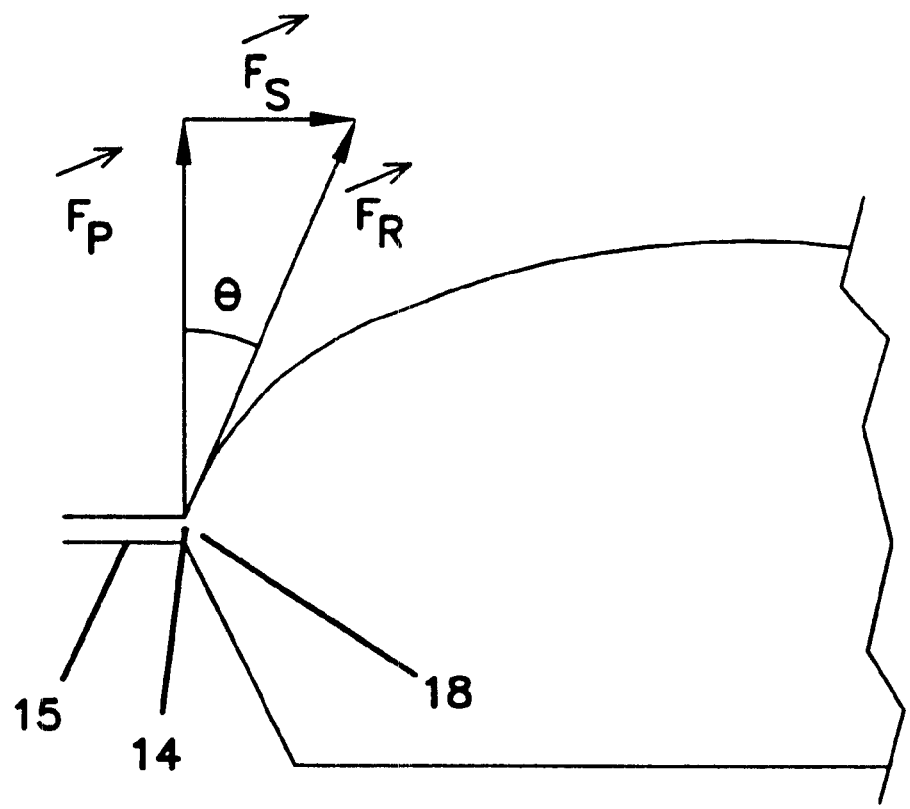

The resultant load vector can be resolved into loads perpendicular to the plane of the projected area, $F_N$ and parallel to the plane $F_O$, and at any point $F_N+F_O=F_R$, an example of which is shown in FIG. 7a. The internal pressure acts against the inner surface of the package such that the product of the projected area and the internal pressure ($P_i$) is equal to $F_N$ distributed over the perimeter of the projected area. The critical region to be analyzed is the one of maximum load. Since $F_N$ is distributed over the perimeter of the projected area, the magnitude of load, $|F_N|$ can be normalized to the perimeter by dividing $|F_N|$ by the perimeter of the projected area.

Knowing the direction of $F_R$ (in this analysis, generally tangent to the deformed package at the point of maximum load) and the magnitude and direction of $F_N$, one can calculate the magnitude of $F_R$ by vector addition or simple trigonometric equations. $F_R$ can be fully defined by its magnitude and direction.

Figure 7C:
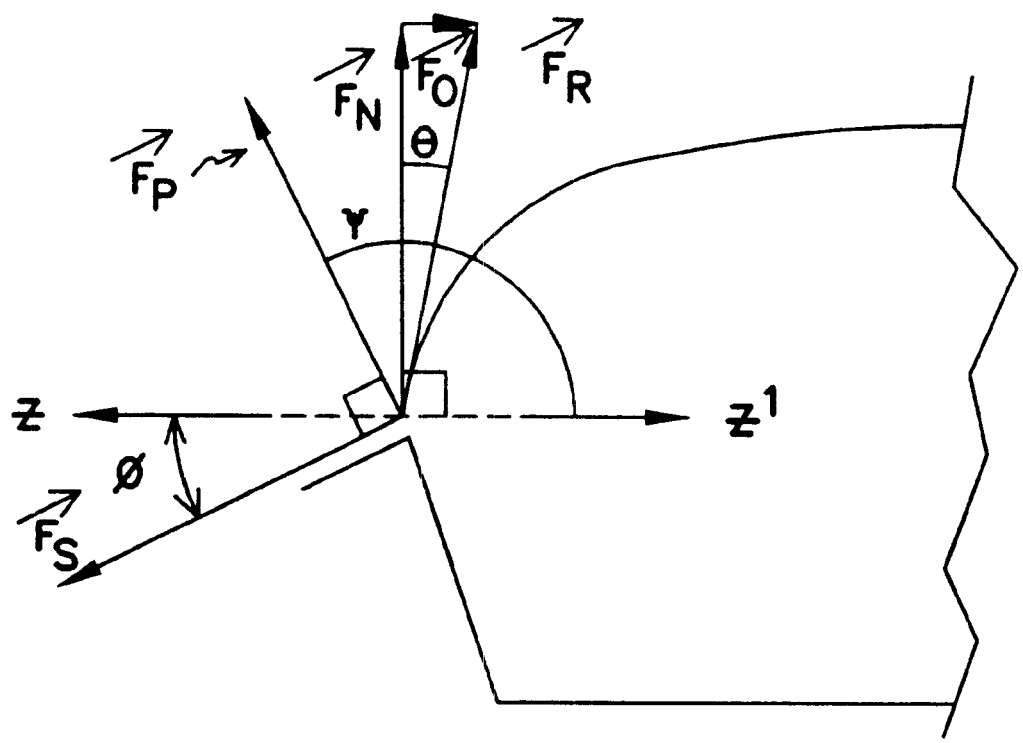

In order to determine the peel and sheer forces resulting from internal pressure, $P_i$, on the seal of a package, the resultant force vector $F_R$ is resolved into a force, $F_P$, at the point of maximum load and perpendicular to the plane of the seal at the point of maximum load and into a force, $F_S$, parallel to the plane of the seal at the point of maximum relationship. As with the load vectors, the force vectors can be analyzed using the following relationship: $F_P+F_S=F_R$. In the embodiment shown in FIGS. 7a and b, the plane of the projected area and the plane of the seal at the point of maximum load are the same, so the direction of the load vectors and force vectors is the same. In the embodiment shown in FIG. 7c, the load vectors and force vectors are in different directions because the plane of the projected area and the plane of the seal at the point of maximum load are not the same.

Normalizing the magnitude of $|F_P|$ by the length (l) over which it acts gives a loading factor $|F_P|/l$ in dimensions of force per unit length. This is the same dimension and direction as the peel strength of the seal in peel ($S_P$). For a package to withstand internal pressure, $S_P \geq |F_P|/l$. Similarly, $S_S \geq |F_S|/(seal\ width \times length)$ to withstand the shear load at the point of maximum load. In summary, the projected area ($A_P$) which is a measure of the size of the package, and the internal pressure are used to determine the resultant force ($F_R$) on the seal in the region of highest load and the resultant force then allows one to determine the load on the seals in both peel and shear directions.

Thus, the required seal strength is related to both the size of the package and the internal pressure of the package. For a given internal pressure necessary to achieve product performance, the required seal strength can be determined for a given size package or, alternately, the size of a package able to sustain the pressure can be determined given the seal strength of the available packaging materials. The approach has also been used to define the internal pressure that the package can sustain for a given size and for the seal strength of available packaging materials.

Figure 2:
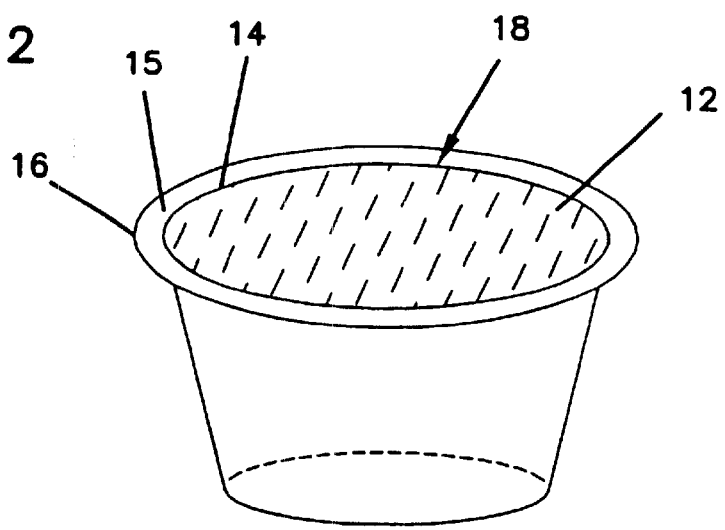
FIG. 2 is a perspective view of one embodiment of a packaging system which may be used or designed in accordance with one aspect of the invention.
Figure 3:
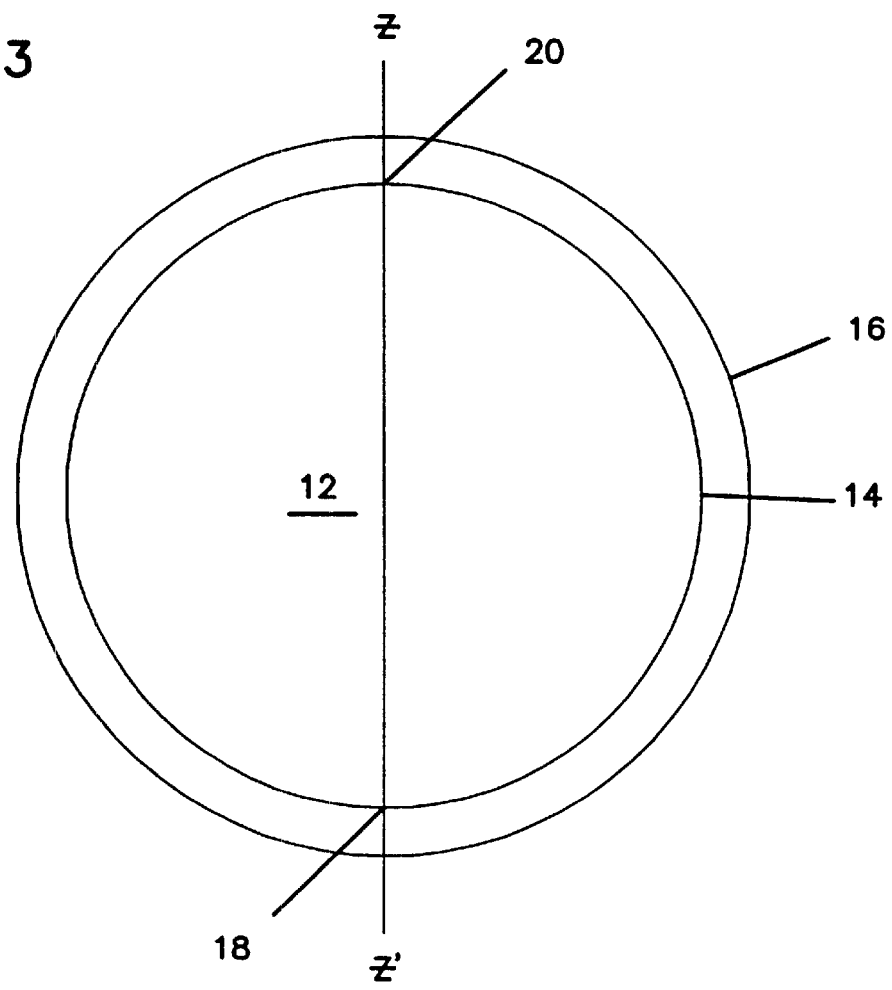
FIG. 3 is a plan view of the sealing element used in the packaging system depicted in FIG. 1.
Figure 4:
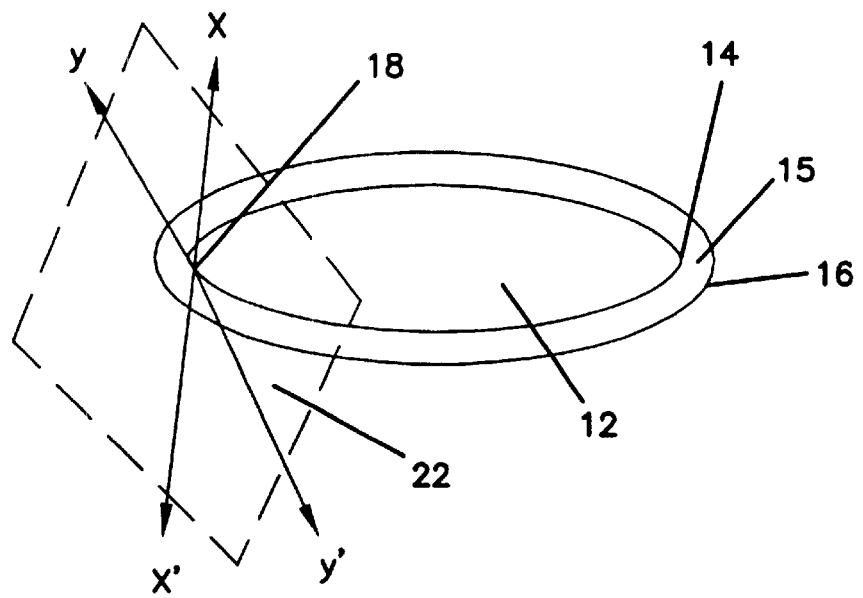
FIG. 4 is a perspective view of the sealing element of the packaging system depicted in FIG. 1, further illustrating application of one aspect of the method of the invention to one embodiment of a packaging system.
Figure 5:
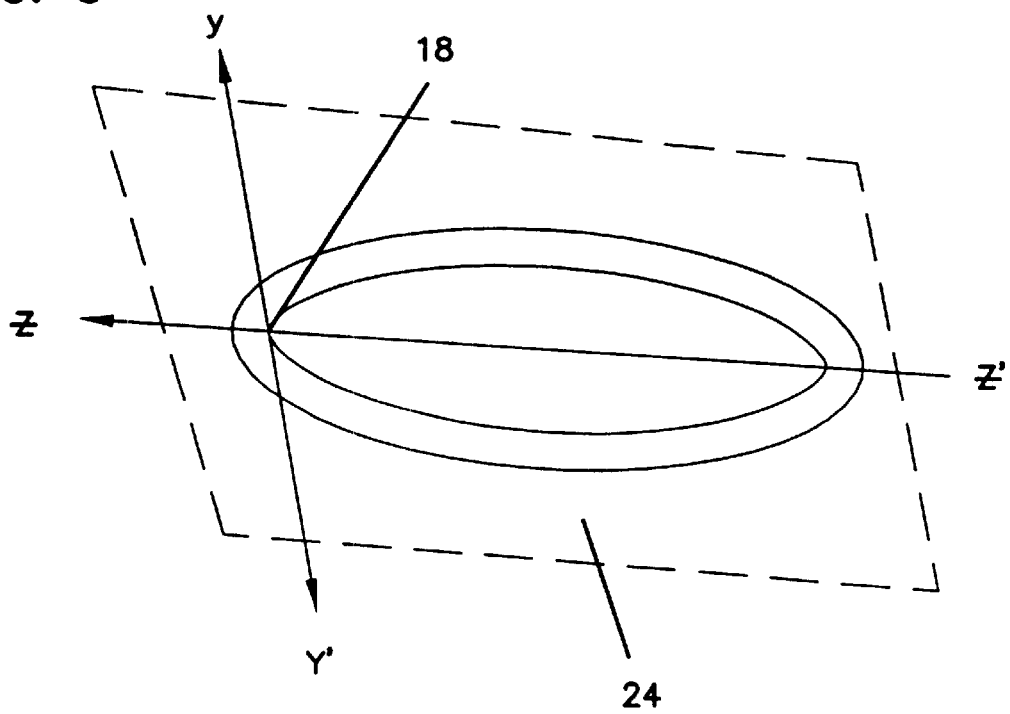
FIG. 5 is a perspective view of the sealing element of the packaging system depicted in FIG. 1 further illustrating application of one aspect of the method of the invention to one embodiment of a packaging system.

One embodiment of the present invention is shown in FIGS. 2–7c. Turning to FIG. 2, one package configuration of the invention shows a flexible lid 12 as depicted having an inner perimeter 14 and an external edge 16 between which lies the seal width 15. The maximum position of load 18 on the seal may be determined through any number of means known to those of skill in the art and it will vary depending upon the shape of the package and the type of seal used. FIG. 3 shows the seal in the embodiment of FIG. 2 in top plan view. From a maximum load position 18, a first plane 24, shown in FIG. 5, is defined by the plane of the lid 12 (assuming that the lid lies in a single plane) and contains the point of maximum load 18. A line Y–Y', shown in FIG. 5, is drawn tangentially from the inner perimeter 14 and lies in plane 24. A second plane 22 is defined perpendicular to plane 24, and line Y–Y' also lies in plane 22 as shown in FIG. 4. A line X–X' passes through the point of maximum load 18 and is perpendicular to the first plane and lies in the second plane 22. A line Z–Z' is drawn perpendicular to plane 22 and passes through position 18.

Figure 6:
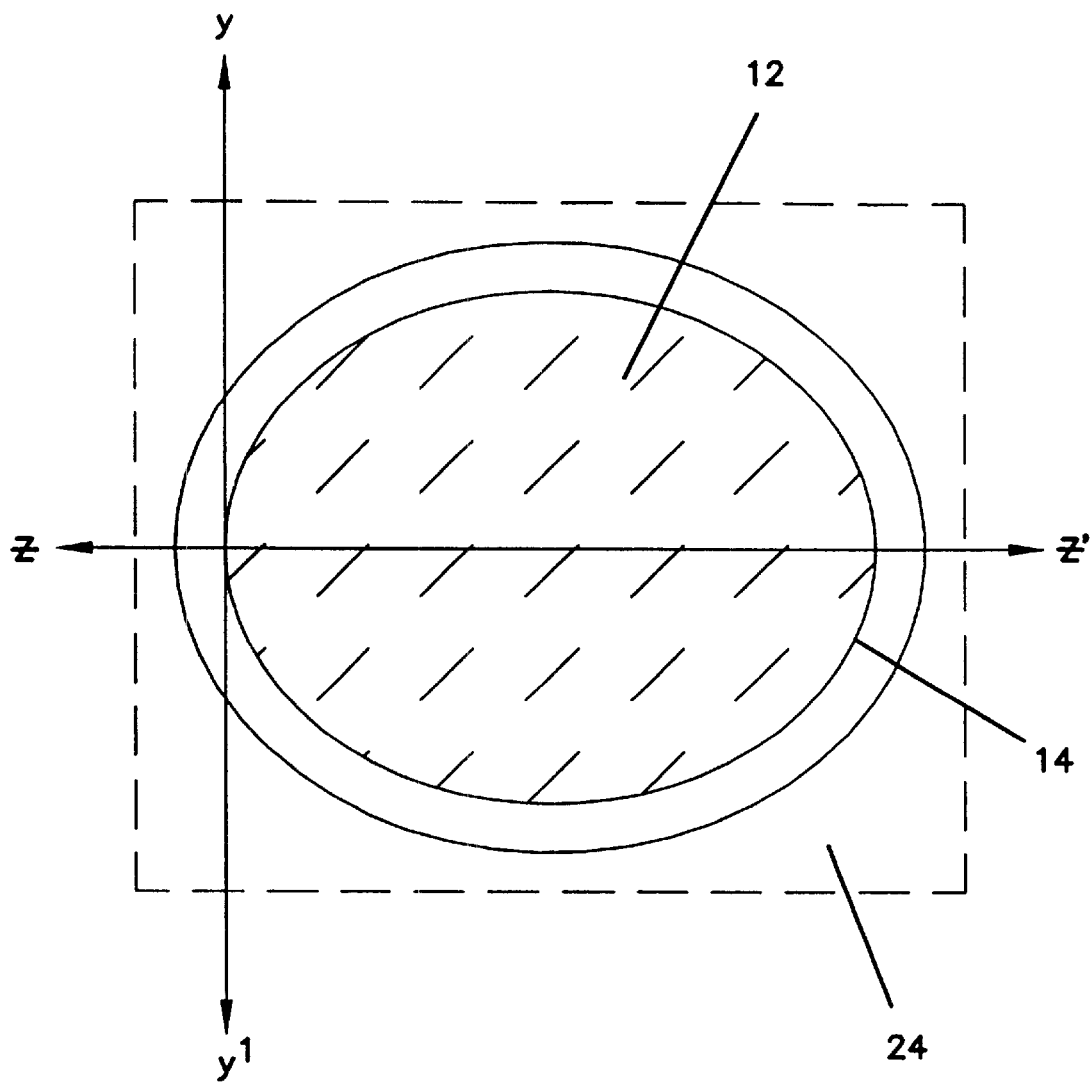
FIG. 6 is a perspective view of the sealing element of the packaging system depicted in FIG. 1 further illustrating application of one aspect of the method of the invention to one embodiment of a packaging system.

The projected area of this embodiment is the area of plane 24 which is bounded by the inner perimeter 14, as shown in the cross-hatched region of FIG. 6. It is the projected area which ultimately determines the pressure holding capacity of the package.

Under pressure the flexible lid domes outward. In its pressurized condition, the maximum package loading occurs around the inner perimeter 14 of seal and, since it is circular, the load is for the most part uniform. As can be seen in FIG. 2, the maximum load position 18 is determined at the inner perimeter 14 of the container. Turning to FIG. 6, the plane of the projected area 12, $A_P$, includes the inner perimeter of the seal 14. In this situation:

$$A_p = \frac{\pi d^2}{4}$$

where d is the inner diameter of the package.

$F_N$ is perpendicular to the plane 24 and must balance the pressure forces on the projected area of the package, so:

$$|\vec{F}_N| = A_p * P_i = \frac{\pi d^2}{4} P_i.$$

$F_N$ is uniformly distributed around the seal perimeter:

$$\frac{|\vec{F}_N|}{\text{perimeter}} = \frac{|\vec{F}_N|}{\pi d}$$

At each point at the perimeter, $F_R$ is tangent to the lid and is uniformly distributed with $$\frac{|\vec{F}_N|}{\pi d}.$$

From vector analysis $$|\vec{F}_N| = |\vec{F}_R| \cos\theta \text{ or } |\vec{F}_R| = \left|\frac{F_N}{\cos\theta}\right|$$

where $\theta$ is the angle between $F_N$ and $F_R$.

Further, distributed load is illustrated as:

$$\frac{|\vec{F}_R|}{\pi d} = \frac{A_p * P_i}{\cos\theta * \pi d} = \frac{\pi d^2 P_i}{4\cos\theta\, \pi d}$$

The cup flange 15 can lie in plane 24 or it may be angled out of that plane. The angle $\phi$ describes this tilted position relative to the line Z–Z', see FIG. 7c. When $\phi=0$, the cup flange and the seal width lie in plane 24 which is the plane of the projected area. $F_P$ is the peel force exerted on the seal and is perpendicular to the seal width. The angle $\psi$ is the angle between the peel force ($F_P$) on the seal and the resultant force ($F_R$). The angle between ($F_R$) and line ZZ' and is 90°–$\theta$. The distributed peel force or loading factor in peel on the seal is:

$$\frac{|\vec{F}_P|}{\pi d} = \frac{|\vec{F}_R|}{\pi d}\cos\psi = \frac{\pi d^2 P_i \cos\psi}{4\cos\theta\, \pi d} = \frac{d\, P_i}{4\cos\theta}\cos\psi$$

As $\Psi$ approaches 90°, the loading factor in peel goes to zero. As $\psi$ approaches 0°, the loading factor reaches a maximum where $\vec{F}_P = \vec{F}_R$. The seal strength in peel ($S_P$) must equal or exceed $$\frac{|\vec{F}_P|}{\pi d}$$

to remain intact. A conservative simplification is to assume $\theta=0$ and $\phi=0$ and $\Psi=0$. In this case, the maximum load factor in peel is obtained by $$\frac{d\, P_i}{4}.$$

A similar analysis of the load factor in shear can also be conducted from knowing $F_R$. The distributed load factor in shear can be approximated by:

$$\frac{|\vec{F}_S|}{A_S} = \frac{|\vec{F}_S|}{(\text{Area inside outer seal perimeter}-\text{Area inside inner seal perimeter})}$$

for a circular cross section. Thus, $$S_S \geq \frac{|\vec{F}_S|}{A_S} = \frac{|\vec{F}_R|\sin\psi}{\pi((d+w)^2 - d^2)}$$

where w is the width of the seal.

Figure 8A:
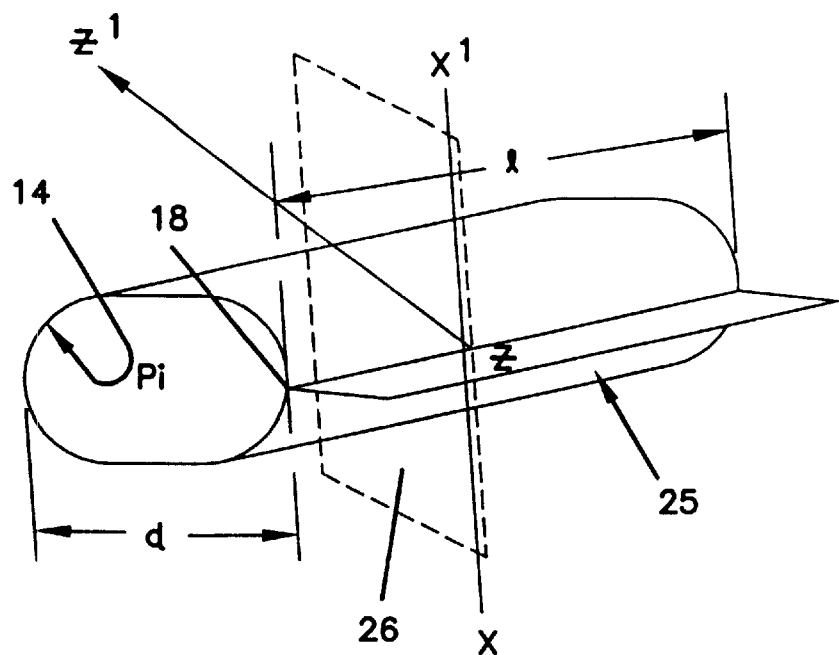
FIGS. 8a through 8c are various views depicting application of one aspect of the method of the invention to an additional further exemplary embodiment of a packaging system in accordance with the invention.
Figure 8B:
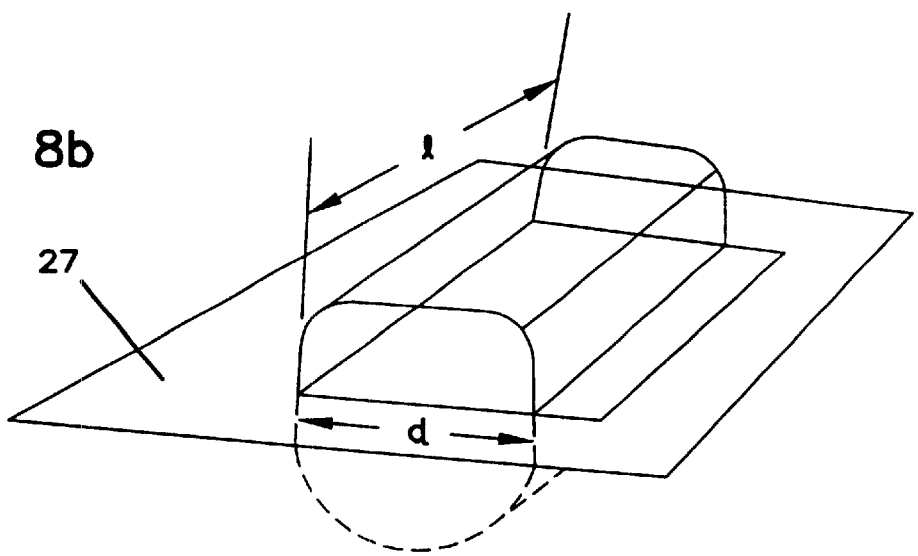
Figure 8C:
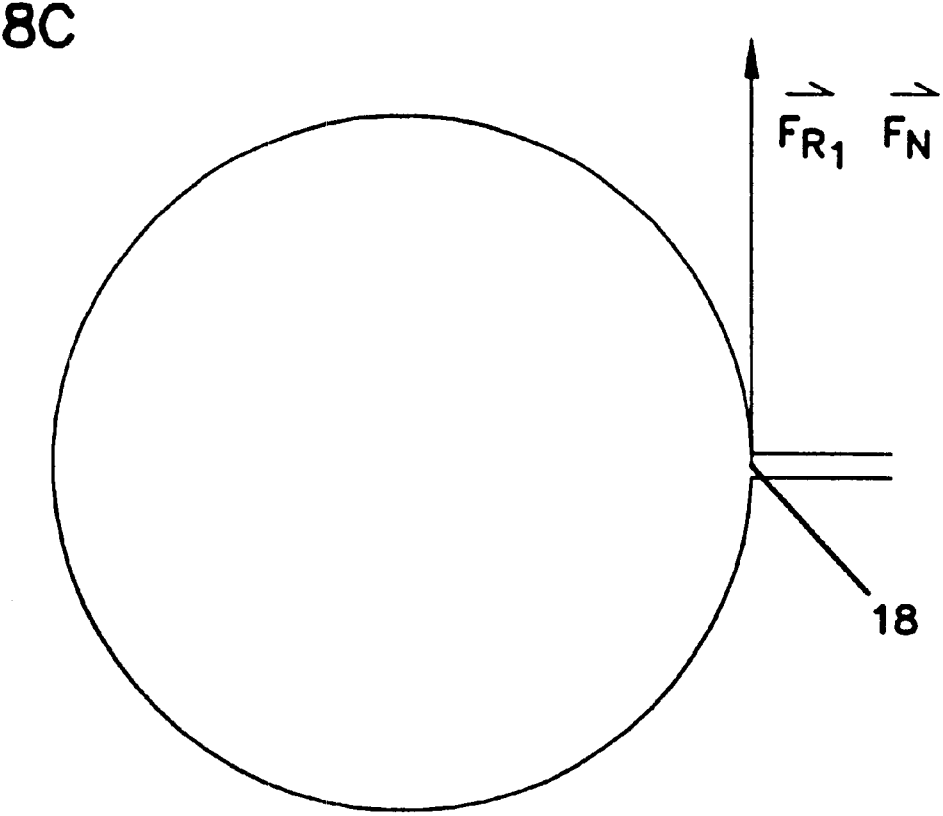

Another embodiment of the present invention is shown in FIGS. 8a–c. The system involves flexible pouches containing a leavened dough. In this case, the pressurized package composed of flexible materials assumes a cylindrical shape. If the package is long, the loading on the seal can be approximated by ignoring the ends of the cylinder and analyzing a center portion where load is maximum.

To illustrate, FIG. 8a shows a fin seal 25 running longitudinally along the package and internal pressure $P_i$ generated by the dough is contained therein. The position of maximum load 18 on the seal in this configuration is the inner edge of the seal and is uniform along its length. One skilled in the art will recognize that imperfections and seal variations will cause some variation in load but for the purposes of design, the load is assumed uniform.

To determine the projected area of this configuration, the axis of radial symmetry, X–X' is determined based on the configuration. A line Z–Z' is drawn from the position of maximum load 18 and perpendicularly intersects the axis X–X'. Line Z–Z' and axis X–X' define a plane 26. A second plane 27 is defined perpendicular to plane 26 and contains position of maximum load, 18. The projected area is defined by the area of plane 27 bounded by the perimeter of the package, shown as the cross-hatched region in FIG. 8b.

Using the approach provided herein, projected area (cross hatching) is the product of length (l) and diameter (d). Thus:

$$A_p = l * d$$

and $$|\vec{F}_N| = A_p \times P_i.$$

In this embodiment, as shown in FIG. 8c, $\vec{F}_R = \vec{F}_N$ and have the same magnitude and direction, thus the angle between them is 0° and $\vec{F}_S = 0$. As a result, $$|\vec{F}_N| = A_p * P_i = (l*d)*P_i = |\vec{F}_R|.$$

$F_R$ is distributed across the two length sides of the cylinder where material is present in the package but not the ends. An open end is assumed, and thus there are no end effects.

Since $F_R$ and $F_P$ are in the same direction $\vec{F}_P = \vec{F}_R$ and are normalized to the length over which $F_P$ acts, $$\frac{|\vec{F}_P|}{2l} = \frac{(l*d)P_i}{2l} = \frac{d*P_i}{2}$$

Therefore, for a cylindrical pouch the seal strength $S_P$ must exceed $$\frac{\vec{F}_P}{2l} \text{ or } S_P \geq \frac{d*P_i}{2}$$

to prevent seal failure in use. Thus, the pressure, and in turn product quality, is related to the size of the package, in this case d, and to the seal strength requirement in peel. Since $\vec{F}_S=0$, there is no shear loading and the design is limited by peel strength.

The embodiments described above show approximations one can use to relate product quality and pressure to a package size seal strength and seal geometry for a pressurized package. Similar analysis can be performed with techniques known to those skilled in the art such as Finite Element Analysis and the like whereby predictions of load factors can be made and the pressure holding capacity predicted.

From the analyses described above, the determinations of seal peel strength and seal shear strength under the desired pressure conditions determine the type, size and configuration of suitable seals. This therefore permits a great deal of flexibility in the kinds of packaging systems suitable for use in the present invention.

In application, cups and pouches are generally two of the more preferred types of packaging used for refrigerated doughs. Cups may be sealed with flexible or rigid lid stock. Pouches may be made from flexible materials. One skilled in the art will understand that packaging materials are to be selected according to their strength and suitability for use with dough or batter formulations. Preferably, the ability of the material to sustain internal pressures will approximately be greater than or equal to the strength of the seal. One method of determining the strength of a material is outlined in ASTM D882, Annex A1, "Determination of Tensile Energy To Break."

Any number of food package configurations may be designed using the method of the invention. For example, cups, pouches, boxes and trays are among the great variety of packaging that can be used. Further, this packaging system may be used for any food product which is packaged and stored under pressure to ensure the quality and integrity of the food product.

Further, the invention is also applicable to any type of seals such as overlap seals having a distributed load where the seal is in shear and the strength of the seal is dictated by the overlap and the material strength. The invention is also applicable to fin seals where there is a localized load and the seal strength is limited by the seal and peel. Another example of a seal is a tack down fin seal where there is a distributed load and the strength of the seal is determined by the combined peel shear resistance of the seal itself.

The invention is also applicable to rigid receptacles such as cups which have non-rigid and rigid tops sealed around a specific edge. Packaging systems made in accordance with the invention may comprise any number of flexible or rigid substrates. Materials including metals and metal alloys, natural or synthetic polymers, and cellulose may all be used in either pure or composite form. The materials used may have heat tolerances that permit the dough to be baked within the package after breaking the seal and optionally removing the lid. Exemplary materials include plastic sheeting, paper, paperboard, metal foils, metal pans and plastic cup stock, polyester films, bakers parchment, polyester on paperboard, and polyester etherimide, among others. The packaging material may comprise any number of other polymeric compositions, blends and materials such as polymers derived from vinyl chloride, ethylene, propylene vinyl acetate, butene, butadiene, nylon, carbonate, alkene terephthalate, acrylic acid, acrylic acid esters, butyl rubber, cellulosic derivatives, isoprene, urea, urethane, amino resins, imides, starch, starch derivatives and mixtures thereof.

Generally, the invention may be used with any dough or batter which is leavened and refrigerated. Those doughs and batters to which this invention may be applicable include those derived from grain constituents such as flours, germ, and bran from wheat, oats, rye, sorghum, barley, rice, millet, and corn, among others. Generally, doughs will comprise from about 40 to about 70 wt- % of a flour. In turn, batters will comprise from about 10 to about 40 wt- % of flour. Doughs will comprise from about 20 to about 40 wt- % water while batters will comprise from about 20 to about 70 wt- % water.

The doughs and batters to which this invention is applicable also generally comprise a leavening agent which may either be a yeast or a chemical leavening system. Doughs comprising leavening agents such as air, steam, yeast, and baking powders all find applicability to the present invention. Baking powder such as sodium bicarbonate and the combination of one or more baking acids with sodium bicarbonate are also leaveners useful in accordance with the invention. Baking acids useful for chemical leavening and dough mixtures include monocalcium phosphate monohydrate, sodium aluminum sulfate, sodium acid pyrophosphate, sodium aluminum phosphate, dicalcium phosphate, glucono-delta lactone, and potassium hydrogen tartrate, and mixtures thereof. One or more of the baking acids may be combined with the sodium bicarbonate to form the chemical leavening agent.

Preferably doughs and batters of applicability to the present invention comprise from about 0.1% to 5% of a leavening agent or a leavening system.

Along with leavening agents, doughs and batters useful in the present invention may also comprise any number of other constituents as known to those skilled in the art including sugar, salt, emulsifiers, colorants, flavorants, and other constituents.

In the context of this invention, "stability" and "shelf stability" mean that the product in question is free from alterations in any form that would result in the product becoming unusable for its intended purpose. In the context of food products, stability and shelf stability mean that the food is free from anything which would destroy the organoleptic properties of the food.

The packaging system of the present invention is capable of maintaining any internal equilibrium pressure. Preferably the internal equilibrium pressure is less than about 35 psig, and more preferably less than about 25 psig, for periods greater than about 3 weeks, preferably greater than about 3 months, and more preferably greater than about 6 months at refrigeration temperatures ranging from about 32° F. to 55° F.

Doughs of the present invention, when baked, are capable of achieving specific volumes ranging from about 1 cc/g to 10 cc/g, preferably from about 3 cc/g to 7 cc/g, and more preferably from about 3.5 cc/g to 6.5 cc/g. Any means known to those skilled in the art may be used to bake doughs used with the packaging system of the present invention.

WORKING EXAMPLES

The following examples are illustrative, but not limiting, of the invention.

Working Example 1

In this example, sealing was completed using a Wave Sealer from James River Co. operated using the methods taught in U.S. Pat. Nos. 5,164,208 issued Nov. 17, 1992 and 5,240,133 issued Aug. 31, 1993 both to Thomas. Cups and lid stock from James River Co. were sealed under varying sealing conditions were on a Wave Sealer (also from James River Co.). These samples were then fitted with a septum on the area just below the flange. The septum was secured in place with a hose clamp to prevent any air from escaping from behind it. An air line with a pressure regulator and pressure transducer attached to it was connected to a side port syringe needle. The pressure transducer was connected to a 5V power supply and then to a Soltec chart recorder. The syringe needle was placed through the septum in the cup side, and the pressure was slowly increased until the seal failed. The data from the strip chart recorder was digitized and transcribed onto a computer spread sheet. A list of sample calculations is provided below:

| Seal Condition 1: | | Seal Failure (condition 1) | |
|---|---|---|---|
| Seal pressure | 53 psig | Mean (psig) | 19.02 |
| Clamp ring pressure | 48 psig | Std. Dev | 1.13 |
| Seal temperature set | 555 F | +2 sigma (psig) | 21.28 |
| Seal time | 1.0 sec | −2 sigma (psig) | 16.76 |
| Seal Condition 2: | | Seal Failure (condition 2) | |
| Seal pressure | 53 psig | Mean (psig) | 24.26 |
| Clamp ring pressure | 48 psig | Std. Dev | 4.88 |
| Seal temperature set | 555 F | +2 sigma (psig) | 34.02 |
| Seal time | 1.0 sec | −2 sigma (psig) | 14.50 |

In the context of this experiment, the terms used above have the following meaning:

| | |
|---|---|
| Seal Pressure: | The amount of pressure applied by the seal head during contact with the cup. The seal head is the heated portion of the sealer which is responsible for forming the wave seal. |
| Clamp Ring Pressure: | The amount of pressure applied by the clamping ring of the seal head. The clamping ring engages prior to seal head engagement. The function of the clamping ring is to secure the lidstock and cup in position prior to the head contact. |
| Seal Temperature Set: | The temperature at which the seal head is set. |
| Seal Time (dwell): | The amount of time that the seal head is in contact with the cup |

As pressure was increased in these packages, several predictable structural changes occurred. The foil lidstock began to dome and became irreversibly distorted as pressure was increased, and the bottom of the package became rounded off and deformed as pressure increased.

Working Example 2

| Ingredient | % |
|---|---|
| Flour | 51.87 |
| Water | 31.82 |
| Vital Wheat Gluten | 3.07 |
| Shortening | 2 |
| Flavor | 2.70 |
| Sucrose | 2 |
| Dextrose | 2 |
| Glucono Delta Lactone | 1.592 |
| Salt | 0.99 |
| Encapsulated Soda | 1.373 |
| diacetyl tartaric acid monoglyceride | 0.4 |
| Xanthan Gum | 0.154 |

Two hundred cubic centimeter (internal volume), 307 diameter (3 7/16" outer diameter) polypropylene cups were packed with three different pack weights of dough (180 g, 140 g, 100 g). Fifteen of the 180 g packages were vented by creating a small needle hole under the lid flange and sealed in a normal air environment. Nine 180 g packages were sealed in normal air without venting. Nine of the 180 g packages were flushed with $CO_2$ prior to sealing, and another nine were flushed with nitrogen prior to sealing. Fifteen 140 g samples were vented in the same manner as above, and sealed in air. An additional 15, 140 g samples were flushed with $CO_2$ prior to sealing. The 100 g samples were comprised of extra dough material. All packages were floor proofed for one hour before storage at 45° F. After proofing, several of the $CO_2$ and nitrogen flushed packages were analyzed for oxygen content using gas chromatography. Three samples of each variable were evaluated at 0 weeks, 1 week, and 5 weeks for pressure, baked specific volume, cell structure, and were also x-rayed to determine dough expansion and head space. The product was baked for 25 minutes at 375° F. either in the cup or by removing the dough and baking it on a baking sheet.

TABLE

| Weight (g) | Pres (psig) | Gas | Batch Number | S.V. (cc/g) | Bake Condition |
|---|---|---|---|---|---|
| Week 0 | | | | | |
| 180 | 10.313 | AIR VENT | 1 | 4.47 | SHEET |
| 180 | 13.5 | AIR | 2 | 4.06 | SHEET |
| 180 | 12.875 | N2 | 7 | 3.91 | SHEET |
| 180 | 11.938 | $CO_2$ | 6 | 4.32 | SHEET |
| 140 | 4.44 | AIR VENT | 3 | 5.58 | SHEET |
| 140 | 8.875 | $CO_2$ | 3 | 5.32 | SHEET |
| 180 | 12.38 | $CO_2$ | 6 | 3.98 | CUP |
| 180 | 10.25 | AIR VENT | 1 | 4.2 | CUP |
| 180 | 10.37 | AIR | 2 | 4.1 | CUP |
| 180 | 12.52 | N2 | 7 | 3.64 | CUP |
| 140 | 4.69 | AIR VENT | 5 | 3.99 | CUP |
| 140 | 8.688 | $CO_2$ | 4 | 4.42 | CUP |
| Week 1 | | | | | |
| 180 | 14.38 | AIR | 2 | 3.95 | SHEET |
| 180 | 13.13 | N2 | 7 | 3.88 | SHEET |
| 140 | 5.13 | AIR VENT | 3 | 4.6 | SHEET |
| 180 | 11 | AIR VENT | 8 | 3.82 | SHEET |
| 180 | 11.38 | AIR VENT | 1 | 4.7 | SHEET |
| 140 | 9.88 | $CO_2$ | 5 | 4.43 | SHEET |
| 180 | 12.88 | $CO_2$ | 6 | 3.78 | SHEET |
| 180 | 10.75 | AIR VENT | 1 | 5.35 | SHEET |
| 180 | 11.13 | AIR VENT | 8 | 4.76 | SHEET |
| 140 | 5 | AIR VENT | 5 | 4.7 | SHEET |
| 140 | 9.5 | $CO_2$ | 4 | 4.49 | SHEET |

TABLE-continued

| Weight (g) | Pres (psig) | Gas | Batch Number | S.V. (cc/g) | Bake Condition |
|---|---|---|---|---|---|
| 180 | 11.38 | AIR VENT | 1 | 4.79 | SHEET |
| 180 | 12.63 | $CO_2$ | 6 | 4.27 | SHEET |
| 180 | 10.88 | AIR VENT | 8 | 3.95 | SHEET |
| 140 | 9.38 | C02 | 3 | 5.33 | SHEET |
| 140 | 5.12 | AIR VENT | 4 | 4.83 | SHEET |
| | | Week 5 | | | |
| 180 | 12.25 | AIR VENT | 1 | 5.86 | SHEET |
| 140 | 6 | AIR VENT | 3 | 6.47 | SHEET |
| 140 | 5.5 | AIR VENT | 4 | 6.55 | SHEET |
| 140 | 6.25 | AIR VENT | 2 | 6.36 | SHEET |
| 140 | 3.25 | AIR VENT | 5 | 5.41 | SHEET |
| 140 | 10 | $CO_2$ | 4 | 5.85 | SHEET |
| 140 | 10.75 | $CO_2$ | 5 | 5.71 | SHEET |
| 140 | 10 | $CO_2$ | 3 | 5.77 | SHEET |

Oxygen Content For Flushed Packages (%)

| | $CO_2$ | 02 | N2 |
|---|---|---|---|
| 140 $CO_2$ | 69.6 | 6.0 | 24.4 |
| 140 $CO_2$ | 45.2 | 11.0 | 43.8 |
| 140 $CO_2$ | 40.4 | 12.0 | 47.6 |
| 180 $CO_2$ | 44.0 | 10.9 | 45.1 |
| 180 N2 | 6.6 | 7.9 | 85.5 |

This was the concentration of gas in the head space for in five random cans that were flushed, tested by gas chromatography after proofing.

Internal pressure caused doming of the lid and rounding of the bottom of packages. Packages for the 100 g vented samples were not domed. Color of dough product appeared normal. Vented packages did not produce a loud noise upon opening. Non-vented packages produced a pop when opened (noise varied with pressure). Baked product showed good cell structure and formation. No real large voids noticed. Baking in the cup did not produce as high specific volumes as product baked on a sheet.

The following results show packages with seal failure during storage at 45° F.:

| Variable | # of Package Failures | Total of Variable | % of Total Failed |
|---|---|---|---|
| 180 g non-vent | 7 | 10 | 70% |
| 180 g vented | 5 | 20 | 25% |
| 180 g $CO_2$ | 3 | 10 | 30% |
| 180 g N2 | 4 | 10 | 40% |
| 140 g vented | 1 | 10 | 10% |
| total | 18 | | |

Baked specific volumes ranged from ~3.6–6.5 cc/g for this experiment. In general, the 140 g samples (air vented, $CO_2$) gave the best specific volumes. The data also suggests that the higher raw dough specific volumes gave a better specific volume. Since a higher dough specific volume is a function of pack weight (when the same volume package is used) these two pieces of data agree. The lower range of specific volumes were generally associated with higher pressure, low dough specific volume packages. The highest pressure seen in any surviving packages was 14.38 psig (180 g, non-vented). The highest pressure packages were the 180 g (non-vented, $CO_2$, N2) variables, followed by the 180 g vented packages. Gas flushing was generally ineffective in this experiment. X-rays of the packages revealed that dough in the vented 180 g and 140 g packages expanded to fill the entire volume. Non-vented samples were not able to fully expand due to trapped gas in the headspace. The 100 g samples were not able to expand to fill the volume, and collapsed. Specific volume appeared to increase slightly with age. The increase was most noticeable with the 140 g vented group. The 180 g variables showed the highest failure rate in storage. By looking at the data table for self failure of packages it appears that the vented and non-vented air packed variables showed an equal amount of failures (both showed 5). However, overall there are twice as many vented packages as non-vented packages in this experimental design so the percentage of package failure is higher with the non-vented group.

Working Example 3

Chemically leavened dinner rolls were flushed with $CO_2$ and sealed using the Wave Seal lidstock and sealer described in Example 2 under the following conditions.

| Conditions: | |
|---|---|
| Set Point Temp: | 535 F. |
| Seal Pressure: | 40 psig |
| Clamp Pressure: | 20 psig |
| Dwell: | .7 sec |
| Seal Strength | |
| Non-barrier homo PP cups | ~21 psig |
| Barrier homo PP cups | ~26.5 psig transducer 377579 cal 17.0011 mV/v excitation 5 V mV 85.0055 capacity 50 psig/mV 0.588197 |

| Cup | mV @ Fail | Pressure @ Fail (psig) |
|---|---|---|
| 76 mm Barrier cups James River Co. Air Burst | | |
| 1 | 46.75 | 27.50 |
| 2 | 44 | 25.88 |
| 3 | 44.5 | 26.17 |
| avg | | 26.52 |
| 76 mm non-barrier cups James River Co. Air Burst | | |
| 1 | 33.50 | 19.70 |
| 2 | 38.25 | 22.50 |
| 3 | 34.5 | 20.29 |
| | | 20.83 |

The cups were proofed at room temperature for ~90 minutes and placed in 45° F. storage. Product was packed in a 90 cc cup with 45, 55 and 65 grams of dough.

Prior to baking, oxygen levels were checked using the Systec Oxygen analyzer. All cups tested were under 0.2% oxygen (see data attached). The product was baked at 330 F. for 27 minutes in the cup. Product was allowed to cool and baked specific volume (BSV) was measured using rapeseed displacement method.

The Cups used were 76 mm homopolymer polypropylene cups with a barrier layer (James River Co.). Product was evaluated at 7 days post pack.

| Pack Wt. | Pressure (psig) | BSV (cc/g) |
|---|---|---|
| 58 g | 8.1 | 3.78 |
| 58 g | 7.7 | 4.01 |
| 56 g | 7.0 | 3.41 |
| 44 g | 5.1 | 3.63 |
| 45 g | 5.7 | 3.22 |
| 58 g | 8.2 | 3.87 |
| 56 g | 7.5 | 3.57 |
| 43 g | 6.1 | 4.45 |
| 57 g | 6.91* | 4.10 |
| 44 g | 4.65* | 4.85 |
| 43 g | 4.53* | 4.77 |

*pressure measured with transducer and side port needle

Pressure was taken using the Metricor Fiber Optic system. Pressure was taken through the bottom of the cup. No gas was observed escaping during pressure measurement, and headspace was still present upon opening of the cup. Upon opening a small hiss was heard as the gas escaped.

Uneven heating of the seal head on the wave sealer caused non-uniform sealing of the cups around the perimeter.

By varying the dwell, temperature, and seal pressure, we were able to identify conditions that give us acceptable strength while minimizing the non-uniformity of the seal. The seal still exhibits a heavy wave region and a lighter wave region, and also some formation of a double wave in the heavy wave area. Fracture of the lidstock by extruded cup material is minimized at these conditions.

To assure that the easy open function operates, the pull tab on the lidstock should be located on the back side of cup when placed in the sealing base.

| Conditions: | |
|---|---|
| Set Point Temp: | 535 F. |
| Seal Pressure: | 40 psig |
| Clamp Pressure: | 20 psig |
| Dwell: | .7 sec |
| Seal Strength: | |
| Non-barrier homo PP cups | ~21 psig |
| Barrier homo PP cups | ~26.5 psig |

Gas flushing was set-up as follows. Corrugated cardboard is flush with backing ring on sealing base. Gas is introduced through small holes in nylon tubing. The tubing is placed far enough back from cup retaining ring so it is not crushed by the clamping ring on the seal head.

A 5.5"×4.5" piece of wave seal lidstock is secured to the cardboard, over the gas line and the cup using two sided tape (tape is attached to the cardboard). The distal end of the lidstock from the gas line is left unsecured to allow the gas to escape after it flushed the cup. Gas is passed over the cup from front to back, air in the cup is flushed out with the $CO_2$ that passes over and replaced with $CO_2$ in accordance with the Venturi principle. The seal head is activated and the cup is sealed.

| Gas Flush Parameters: | |
|---|---|
| Gas pressure: | ~4 psig at regulator |
| Flush time: | ~20 seconds |

-continued

| Gas Flush Parameters: | |
|---|---|
| Flush gas: | $CO_2$ |
| Lidstock: | 5.5" × 4.5" waveseal lidstock |

During verification of protocol development, $O_2$ levels were between 0.27% and 0.58% after flush on an empty cup*. Tests on flushed, packed product showed levels of 0.0001%. * Oxygen levels checked using Toray Oxygen analyzer with small side port needle inserted through septum in lidstock.

Chemically Leavened Dinner Rolls in 76 mm Wave Seal Cups Package Preparation

The 76 mm (3 oz) polypropylene cup was used for this experiment. This cup has a gas barrier and was not vented. A hole was drilled into the bottom of six cups prior to packing. This was done to allow the insertion of pressure transducers to monitor pressure over storage.

Dough Procedure

The dough ingredients were weighed out according to the formula. Dough was mixed in 2500 gram batches using a Hobart mixer with a Mcduffy bowl. The first stage ingredients were mixed on speed 1 for 1.5 minutes and speed two for 1.5 minutes. The dough that formed was then cut into chunks inside the mixer, and the second stage ingredients were added. The dough was then mixed for 30 seconds speed 1 and 3.5 minutes speed 2.

After mixing, the dough was sheeted out on a Rondo sheeter. The final ranged from 12–18 mm depending on the pack weight needed. The dough was cut into round pieces using a cylindrical stainless steel hand cutter. The pack weights were 45, 55, and 65 grams.

After packing, the 76 mm caps were flushed with CO2 for 25 seconds and then sealed using the bench top wave sealer. The product was allowed to proof (rise) for 90 minutes at ambient temperatures and then placed into 45° F. storage. The cups containing the pressure transducers were treated in the same manor.

Product Evaluation

The products pressure was evaluated at 1 week post pack. The product was x-rayed to determine if headspace was present, checked for pressure, headspace gas concentration, and baked specific volume.

Pressure

The products pressure was monitored using pressure transducers for the six cups. A pressure transducer works by having a flat, active surface that contacts the area to be tested. The pressure that is exerted on the flat surface causes a change in the electrical signal output of the transducer. This signal output is recorded on a strip chart recorder or data acquisition system, and by mathematically applying a calibration factor for the transducer to the reading, gives the pressure.

In addition to monitoring the pressure with the transducers, the pressure was taken on product prior to baking. This was done using the Metricor fiber optic pressure measurement system. This system uses a fiber optic probe which transmits a small beam of light from a LED source. This light beam is transmitted down the probe, contacts a small diaphragm at the end of the probe, and is then reflected back up the probe to the sensor unit. When the diaphragm sees differential pressures it defects inward. This deflection causes a shift in the spectrum of the emitted light. This spectrum shift in the light is related to pressure. The Metricor calculates the pressure from the spectrum shift and displays it digitally. The probe was inserted into the package through a hole punched in the cup bottom.

Headspace Gas

The headspace gas concentration was checked for oxygen concentration. To avoid adverse effects on the dough, the amount of oxygen in the headspace must be below a concentration of 1%. This was checked using the Systec Oxygen analyzer. A rubber septum was placed on the cup lid, and the Systec probe/needle was inserted into the headspace. The system has a suction pump which withdraws the headspace gas out of the package and samples it to determine the percent oxygen.

Product Baking

The product was baked in the cups after removing the lidding. The product was baked at 330° F. in a conventional oven for 27 minutes. After baking the product was removed from the cups and allowed to cool for 1 hour before measuring baked specific volume.

Baked Specific Volume

The baked specific volume of a product is a calculation of the product volume divided by the product weight and is expressed in cc/g. The product volume is measured by placing it in a calibrated box which holds a certain volume of rapeseeds. The box is closed and then filled with rapeseeds. By reading the volume that the rapeseeds occupy, the volume of the product can be determined. This volume is then divided by the weight of the product to give BSV.

After BSV was determined, the rolls were cut open to check for voids and gum layers (unbaked dough).

Dinner rolls.

| Ingredients | % |
| --- | --- |
| 1st stage mixing | |
| Flour | 50.97 |
| Water | 28.89 |
| Flavor | 2.671 |
| Shortening | 3 |
| Preblend* | 4.84 |
| Monoglyceride | 0.15 |
| 2nd stage mixing | |
| Encapsulated soda | 91.086 |
| GDL | 1.231 |
| Salt | 1.162 |
| Sucrose | 4 |
| Dextrose | 2 |
| Total | 100 |

*Preblend:

| | % |
| --- | --- |
| Flour | 45.3 |
| Xanthum gum | 1.28 |
| Gluten | 53.45 |

Processing procedures:
Melt shortening;
Use 30% ice in water;
Mixing:
1st stage: 1.5 min sp. 1; 1.5 min sp. 2.
2nd stage: cut in leavening; mix 0.5 min sp. 1; 3.5 min. high sp.
Farinograph=1000 BU
Extensigraph=150 +/−30
Dough Temp.=62+/−1−2 deg. F.

Working Example 4

Chemically leavened dinner rolls were placed into non-barrier 76 mm cups (James River Co.). Some of the cups were vented by placing a small needle hole below the lid flange. Other cups were gas flushed with $CO_2$ prior to sealing.

Product was packed at 65 g in a 90 cc cup. During production the product was sheeted, then cut to weight with a round biscuit cutter and molded by hand.
76 mm non-barrier cup. 3 oz.
Lidstock: Dayton laminated retort lidstock

| Pack Wt (g) | Pressure (psig) | Baked Wt (g) | Baked vol (cc) | BSV (cc/g) | Flush |
| --- | --- | --- | --- | --- | --- |
| 65 | 3.8 | 63.93 | 200 | 3.13 | vented |
| 65 | 2.2 | 62.88 | 225 | 3.58 | vented |
| 65 | 2.7 | 62.99 | 230 | 3.65 | vented |
| 65 | 3.1 | 63.27 | 220 | 3.48 | vented |
| 65 | 4.4 | 59.88 | 230 | 3.84 | $CO_2$ .24% 02 |
| 65 | 4.9 | 60.32 | 220 | 3.65 | $CO_2$ .21% 02 |

Chemically leavened breadsticks were placed into a compartmentalized semi-rigid tray covered with a peelable film. The results are as follows:

Breadsticks: Chemically Leavened, 25 g, W. R. Grace cryovac peelable film; Packed Day 1; Baked Day 36

| | Baked Wt (g) | Baked Vol (cc) | BSV (cc/g) | Pressure (psig) |
| --- | --- | --- | --- | --- |
| 1 | 20.17 | 110 | 5.45 | 0.353* |
| 2 | 18.09 | 105 | 5.80 | 0.265* |

*seal area around breadstick compartments had started to peel increasing the volume of the compartments.

Pressure was taken on the product 7 days post pack. Prior to baking pressure was taken again. This time pressure was measured using the Metricor Fiber Optic system. Pressure was measured through the bottom of the cup. The $CO_2$ flushed product was checked for $CO_2$ through a septum on the lidstock using the Systec Oxygen analyzer.

Product was baked on 5.9.95 at 330° F. for 25 minutes. Product was removed from cups prior to baking. Baked specific volumes were taken on the product after cooling by rapeseed method.

Working Example 5

Package Preparation

Two types of packages were used for this experiment. The first was the 307 diameter polypropylene cup used in conjunction with the wave sealer. The second type of package used was the 214 diameter composite can normally used with our product. The composite can serve as a control in this experiment.

The 307 cup was used in two versions, vented and non-vented. The vented cups were created by placing a small needle hole under the cup flange. This allows the escape of headspace gases produced during proofing of the dough. The 307 cup had an internal volume of ~200 mL. For this experiment we also needed cups that had volumes of 153 mL and 118 mL. This was achieved by adding liquid paraffin wax to the cups and allowing it to solidify creating a false bottom.

Composite cans were cut on a lathe to specific heights which gave the same volumes as used in the 307 cups (200 mL, 153 mL, 118 mL)

Dough Procedure

The dough ingredients were weighed out according to the formula. Dough was mixed in 50 pound (22700 g) batches using the Day horizontal bar mixer. The first stage ingredients were mixed on speed 1 for 30 seconds (36 rpm) and speed two for 5 minutes (72 rpm). The dough that formed was then cut into chunks inside the mixer, and the leavening acid (GDL) and E-soda was added. The dough was then mixed for 30 seconds speed 1 and 3 minutes speed 2.

Varying levels of leavening agents were used in preparing the doughs. Doughs were prepared with the approximately the same amount of leavening shown in Example 3 (designated in the table below as 1), 5/6 of that amount of each leavening agent, and 2/3 of the amount of each leavening agent. As an example, in preparing a dough designated as "2/3", 2/3 of the amount of soda as in 1 was combined with 2/3 of the amount of acid as in 1.

After mixing, the dough was sheeted out on a Rondo sheeter. The final thickness ranged from 8–14 mm depending on the pack weight needed. The dough was cut into round pieces using a cylindrical stainless steel hand cutter. The pack weights were 100, 135, and 170 grams. The 100 gram pack weights were formed out of a single dough piece, the 135 and 170 gram pack weights were made up of 2 dough pieces of approximately ½ the total pack weight.

After packing, the 307 cups were sealed using the bench top wave sealer and the 214 diameter control cans were closed using the can seamer. The product was allowed to proof (rise) for 90 minutes at ambient temperatures and then placed into 45 F. storage.

Product Evaluation

The product was evaluated at 1 week, 2 weeks, and 4 weeks post pack. The product was x-rayed to determine if headspace was present, checked for pressure, package volume (307 cups), and baked specific volume.

Pressure

The products pressure was obtained using a pressure transducer for the 307 cups, and a Coyne gauge for 214 composite cans. A pressure transducer works by having a flat, active surface that contacts the area to be tested. The pressure that is exerted on the flat surface causes a change in the electrical signal output of the transducer. This signal output is recorded on a strip chart recorder or data acquisition system, and by mathematically applying a calibration factor for the transducer to the reading, gives the pressure.

The pressures for the 307 cup were obtained by using the pressure transducer. For cups without headspace, pressure was taken by drilling a hole through the cup bottom and inserting the transducer into the dough. Cups that did have a headspace were tested by placing a rubber septum on the lidstock, and inserting a syringe needle attached to a connector fitting and pressure transducer through the septum and into the package headspace. This allowed the gas in the headspace to contact the transducer face and give a pressure reading.

The Coyne gauge is a device that was developed to read the pressure of composite cans by correlating the force to deflect the can end back to its original state to the amount of pressure in the can. When the can is under pressure, the metal end deflects (domes) in relation to the amount of pressure inside. The amount of pressure inside is related to the amount of force it takes to cause the can end to be flat again. The device has 3 small contacts placed linearly across a head which is then attached to a force gauge. The can is placed into the device and the head containing the contacts is centered on the can end. A lever is depressed until all three contacts are touching the can end. When the center and at least one of the outer contacts touch the metal can end at the same time, a circuit is closed which lights an indicator light. This light indicates that the can end has been deflected back to its original state. The force read when the indicator light is lit indicates the pressure inside the can.

Package Volume

The volume of the 307 packages were taken to determine the actual internal volume of the cup. The cup and lidstock are made of flexible materials, and exposure of these material to pressure will cause the cup and lid material to dome and stretch. As a result the actual internal volume of the pressurized cup is larger than its initial internal volume.

The actual volume of the cups was determined by experimentally determining the buoyancy of the cups in water. The cup buoyancy is equal to the amount of water displaced by the cup, minus the weight of dough and cup materials. So, by experimentally determining the cup buoyancy and weight of materials, the amount of water displaced by the cup can be determined. The amount of water displaced by the cup is equal to the total volume of the cup. From this total volume, subtract the volume occupied by the cup and lid material to get the internal volume of the cup.

The experimentally measured buoyancy was determined by supporting a scale above a water bucket. A wood dowel was secured across the scale so that the dowel ends overhung each side of the scale plate, and a weighted mesh cage was suspended down from the dowel (attached to each side). The mesh cage was submerged in the bucket of water. The scale was now reading the immersed weight of the cage. When a cup was submerged into the water and floated up against the cage, the scale reading indicates the cage weight minus buoyancy of the cup. The difference between the reading of the cage only and the cage and cup equals the buoyancy of the cup. This buoyancy is used to determine the total package volume (see attached calculations).

The volume of the composite can does not change significantly when exposed to pressure, so the initial can volumes were used.

Product Baking

The product was removed from the cups and cans and placed on baking sheets. The product was checked for discoloration and appearance. The product was then baked in a 380° F. rotary oven for 25 minutes. After baking the product was allowed to cool for 1 hour before measuring baked specific volume.

Baked Specific Volume

The baked specific volume of a product is a calculation of the product volume divided by the product weight and is expressed in cc/g. The product volume is measured by placing it in a calibrated box which holds a certain volume of rape seeds. The box is closed and then filled with rape seeds. By reading the volume that the rape seeds occupy, the volume of the product can be determined. This volume is then divided by the weight of the product to give BSV.

The averaged results of the analysis are shown below

| Age (weeks) | Leavener Level | Sample Size (gms) | Package Volume (cc) | Package type | Internal Pressure | Specific Volume |
|---|---|---|---|---|---|---|
| 1 | 1 | 170 | 200 | Cup Vented | 8.75 | 5.43 |
| 2 | 1 | 170 | 200 | Cup Vented | 9.83 | 4.82 |
| 4 | 1 | 170 | 200 | Cup Vented | 10.3 | 5.17 |
| 1 | 1 | 100 | 118 | Cup Vented | 7.17 | 5.40 |
| 2 | 1 | 100 | 118 | Cup Vented | 7.25 | 5.43 |
| 4 | 1 | 100 | 118 | Cup Vented | 7.25 | 4.53 |
| 1 | 5/6 | 170 | 200 | Cup Vented | 6.42 | 5.30 |
| 2 | 5/6 | 170 | 200 | Cup Vented | 7.04 | 4.94 |
| 4 | 5/6 | 170 | 200 | Cup Vented | 7.58 | 4.56 |
| 1 | 2/3 | 170 | 200 | Cup Vented | 4.5 | 4.88 |
| 2 | 2/3 | 170 | 200 | Cup Vented | 5.5 | 4.89 |
| 4 | 2/3 | 170 | 200 | Cup Vented | 5.75 | 4.47 |
| 1 | 2/3 | 100 | 118 | Cup Vented | 1.42 | 5.02 |
| 2 | 2/3 | 100 | 118 | Cup Vented | 2.25 | 4.62 |
| 4 | 2/3 | 100 | 118 | Cup Vented | 2.75 | 4.72 |
| 1 | 1 | 170 | 200 | Can Vented | 14.88 | 4.39 |
| 2 | 1 | 170 | 200 | Can Vented | 17.49 | 15.81 |
| 4 | 1 | 170 | 200 | Can Vented | 18.08 | 4.41 |
| 1 | 1 | 100 | 118 | Can Vented | 19.06 | 5.21 |
| 2 | 1 | 100 | 118 | Can Vented | 18.28 | 5.02 |
| 4 | 1 | 100 | 118 | Can Vented | 19.44 | 4.46 |
| 1 | 5/6 | 170 | 200 | Can Vented | 12.82 | 5.26 |
| 2 | 5/6 | 170 | 200 | Can Vented | 12.25 | 5.2 |

-continued

The averaged results of the analysis are shown below

| Age (weeks) | Leavener Level | Sample Size (gms) | Package Volume (cc) | Package type | Internal Pressure | Specific Volume |
|---|---|---|---|---|---|---|
| 4 | 5/6 | 170 | 200 | Can Vented | 13.24 | 5.21 |
| 1 | 2/3 | 170 | 200 | Can Vented | 10.35 | 4.94 |
| 2 | 2/3 | 170 | 200 | Can Vented | 7.02 | 4.65 |
| 4 | 2/3 | 170 | 200 | Can Vented | 6.4 | 4.31 |
| 1 | 2/3 | 100 | 118 | Can Vented | 7.52 | 5.11 |
| 2 | 2/3 | 100 | 118 | Can Vented | 5.55 | 4.51 |
| 4 | 2/3 | 100 | 118 | Can Vented | 6.4 | 4.23 |
| 1 | 1 | 135 | 200 | Cup Vented | 3.92 | 5.46 |
| 2 | 1 | 135 | 200 | Cup Vented | 3.75 | 4.95 |
| 4 | 1 | 135 | 200 | Cup Vented | 4.92 | 4.51 |
| 1 | 2/3 | 135 | 200 | Cup Vented | 0 | 3.71 |
| 2 | 2/3 | 135 | 200 | Cup Vented | 0 | 2.27 |
| 4 | 2/3 | 135 | 200 | Cup Vented | 0 | 1.7 |
| 1 | 1 | 135 | 200 | Can Vented | 8.22 | 5.02 |
| 2 | 1 | 135 | 200 | Can Vented | 6.78 | 5.6 |
| 4 | 1 | 135 | 200 | Can Vented | 7.21 | 4.69 |
| 1 | 2/3 | 135 | 200 | Can Vented | 1.82 | 3.82 |
| 2 | 2/3 | 135 | 200 | Can Vented | .73 | 3.4 |
| 4 | 2/3 | 135 | 200 | Can Vented | 1.1 | 2.91 |
| 1 | 5/6 | 100 | 153 | Cup Vented | .56 | 4.14 |
| 2 | 5/6 | 100 | 153 | Cup Vented | 1 | 3.72 |
| 4 | 5/6 | 100 | 153 | Cup Vented | 1.5 | 2.72 |
| 1 | 5/6 | 100 | 153 | Can Vented | 1.86 | 4.71 |
| 2 | 5/6 | 100 | 153 | Can Vented | 1.19 | 3.69 |
| 4 | 5/6 | 100 | 153 | Can Vented | 3.18 | 4.3 |
| 1 | 1 | 100 | 200 | Cup Vented | .125 | 4.1 |
| 2 | 1 | 100 | 200 | Cup Vented | 0 | 2.16 |
| 4 | 1 | 100 | 200 | Cup Vented | 0 | 1.66 |
| 1 | 5/6 | 100 | 200 | Cup Vented | 0 | 3.34 |
| 2 | 5/6 | 100 | 200 | Cup Vented | 0 | 2.44 |
| 4 | 5/6 | 100 | 200 | Cup Vented | 0 | 1.83 |
| 1 | 2/3 | 100 | 200 | Cup Vented | 0 | 3.31 |
| 2 | 2/3 | 100 | 200 | Cup Vented | 0 | 2.57 |
| 4 | 2/3 | 100 | 200 | Cup Vented | 0 | 1.77 |
| 1 | 1 | 100 | 200 | Can Vented | .88 | 3.53 |
| 2 | 1 | 100 | 200 | Can Vented | 1.21 | 2.97 |
| 4 | 1 | 100 | 200 | Can Vented | 1.08 | 2.09 |
| 1 | 5/6 | 100 | 200 | Can Vented | .93 | 3.62 |
| 2 | 5/6 | 100 | 200 | Can Vented | 1.11 | 2.51 |
| 4 | 5/6 | 100 | 200 | Can Vented | 1.07 | 2.21 |
| 1 | 2/3 | 100 | 200 | Can Vented | .92 | 3.75 |
| 2 | 2/3 | 100 | 200 | Can Vented | 1.33 | 3.04 |
| 4 | 2/3 | 100 | 200 | Can Vented | 1.09 | 2.34 |

What is claimed is:

1. A packaging system for refrigerated leavened dough comprising:
   (a) a package, said package being capable of maintaining the stability of said dough over time at refrigerated temperatures;
   (b) a leavened dough within said package comprising from about 20 wt-% to 40 wt-% water, from about 40 wt-% to 70 wt-% flour, and from about 0.1 wt-% to 5.0 wt-% of a leavening agent; and
   (c) a seal, said seal configured in relationship to said package so that said package is capable of maintaining an internal equilibrium pressure of less than about 35 psig at refrigeration temperatures resulting from generation of gases by leavening agent in said dough; said dough, when baked, being capable of achieving a specific volume of from about 3 cc/g to 7 cc/g, and said seal having a strength which is about 8 lbs/in or less in peel.

2. The packaging system of claim 1, wherein said package comprises a cup having an edge, said seal being affixed to said cup edge.

3. The packaging system of claim 2 wherein said dough is maintained as stable for greater than about 3 months.

4. The packaging system of claim 2 wherein said internal equilibrium pressure ranges from about 0 to 10 psig.

5. The packaging system of claim 1 wherein said seal has a strength effective to maintain the internal equilibrium pressure in said package.

6. The packaging system of claim 5 wherein said seal strength ranges from about 0.5 lbs/in to 8 lbs/in measured in peel.

7. The packaging system of claim 1 wherein said package comprises a pouch having a first edge and a second edge, said seal comprising the dimension wherein said pouch first edge is joined to said pouch second edge.

8. The packaging system of claim 7 wherein said seal has a strength effective to maintain the internal equilibrium pressure in said package.

9. The packaging system of claim 8 wherein said seal strength ranges from about 0.5 lbs/in to 8 lbs/in measured in peel.

10. The packaging system of claim 7 wherein said dough is maintained as stable for greater than about 3 months.

11. The packaging system of claim 7 wherein said internal equilibrium pressure ranges from about 0 psig to 35 psig.

12. A packaging system for a refrigerated leavened batter comprising:
    (a) a package, said package being capable of maintaining the stability of the batter over time at refrigerated temperatures;
    (b) a leavened batter within said package comprising from about 20 wt-% to 70 wt-% water, from about 10 wt-% to 40 wt-% flour, and from about 0.1 wt-% to 5.0 wt-% of a leavening agent; and
    (c) a seal, said seal configured in relationship to said package so that said package is capable of maintaining an internal equilibrium pressure of less than about 35 psig at refrigeration temperatures resulting from generation of gases by said leavening agent in the batter; said batter, when baked, being capable of achieving a specific volume of from about 3 cc/g to 7 cc/g, and said seal having a strength which is about 8 lbs/in or less in peel.

13. The packaging system of claim 12, wherein said package comprises a cup having an edge, said seal being affixed to said cup edge.

14. The packaging system of claim 13, wherein said batter is maintained as stable for greater than about 3 months.

15. The packaging system of claim 13, said internal equilibrium pressure ranges from about 0 to 10 psig.

16. The packaging system of claim 12, wherein said seal has a strength effective to maintain the internal equilibrium pressure in said package.

17. The packaging system of claim 16, wherein said seal strength ranges from about 0.5 lbs/in to 8 lbs/in measured in peel.

18. The packaging system of claim 12, wherein said package comprises a pouch having a first edge and a second edge, said seal comprising the dimension wherein said pouch first edge is joined to said pouch second edge.

19. The packaging system of claim 18, wherein said seal has a strength effective to maintain the internal equilibrium pressure in said package.

20. The packaging system of claim 19, wherein said seal strength ranges from about 0.5 lbs/in to 8 lbs/in measured in peel.

21. The packaging system claim 18, wherein said batter is maintained as stable for greater than about 3 months.

22. The packaging system of claim 18, wherein said internal equilibrium pressure ranges from about 0 psig to 35 psig.

* * * * *